Patented June 3, 1924.

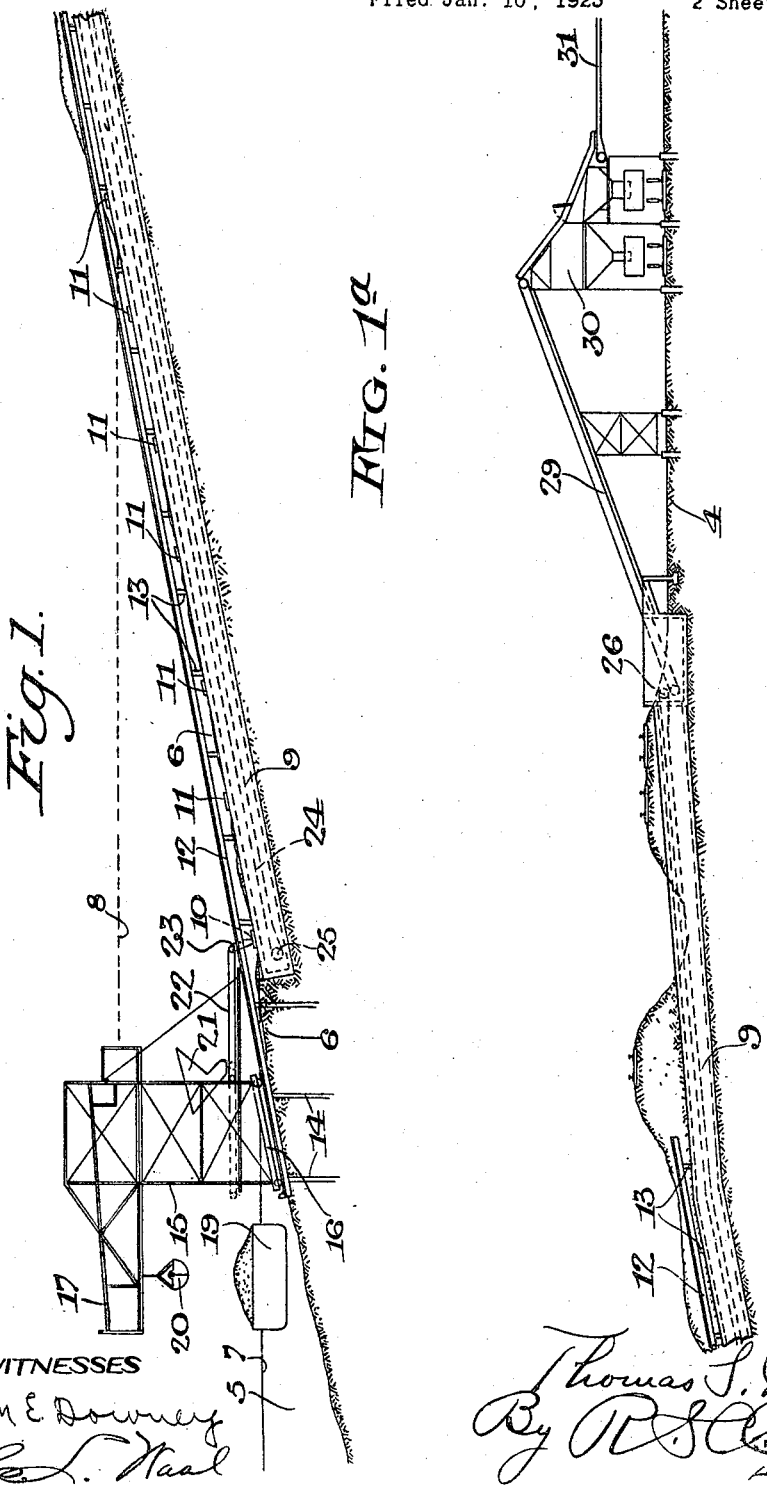

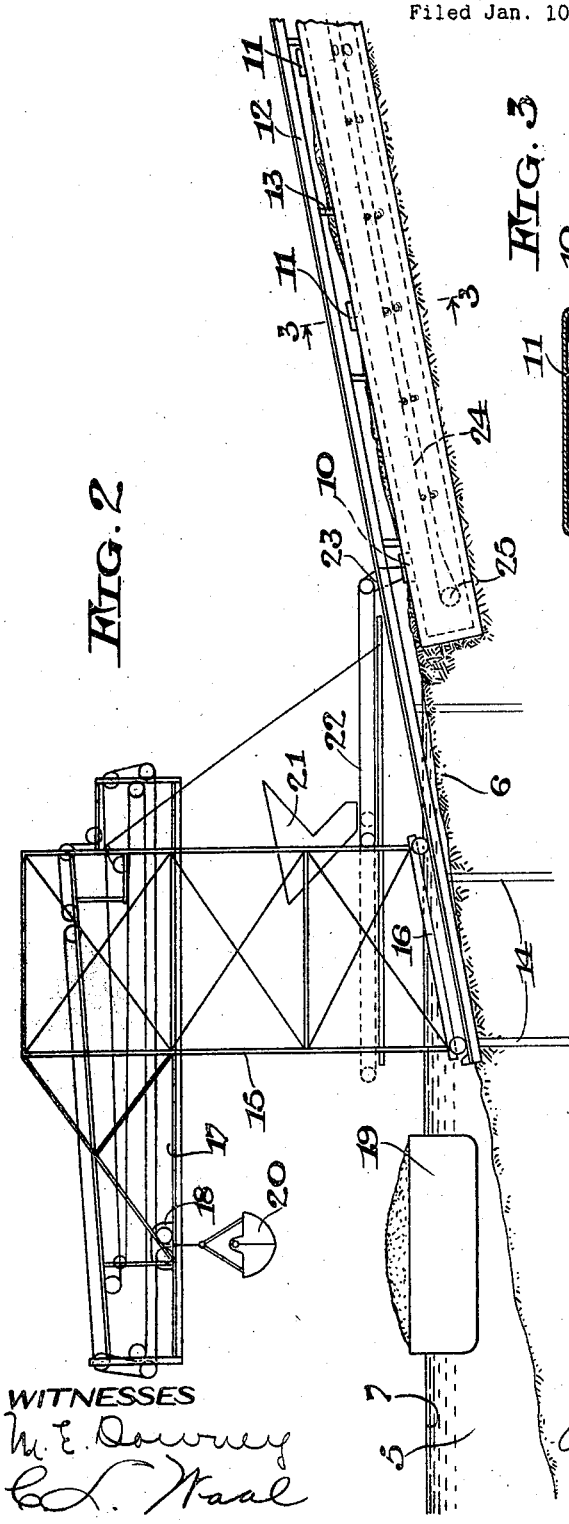

1,496,570

UNITED STATES PATENT OFFICE.

THOMAS S. WATSON, OF MILWAUKEE, WISCONSIN.

CARGO-HANDLING APPARATUS.

Application filed January 10, 1923. Serial No. 611,808.

*To all whom it may concern:*

Be it known that I, THOMAS S. WATSON, a citizen of the United States, and resident of Milwaukee, in the county of Milwaukee and State of Wisconsin, have invented new and useful Improvements in Cargo-Handling Apparatus, of which the following is a description, reference being had to the accompanying drawings, which are a part of this specification.

The invention relates to cargo-handling apparatus.

On rivers, such as the Mississippi River and its tributaries, or other bodies of water where flood conditions are not unusual, considerable difficulty has been experienced in unloading cargoes because of the variance of the water level at different times of the year. This invention has for its object to provide an apparatus for expeditiously unloading cargo boats, more particularly those carrying bulk material, operating on rivers or other bodies of water subject to the above mentioned conditions.

The invention further consists in the several features hereinafter set forth and more particularly defined by claims at the conclusion hereof.

In the drawings: Figs. 1 and 1ª are complementary views, of an apparatus embodying the invention; Fig. 2 is an enlarged detail view of a portion of the apparatus; Fig. 3 is a section taken on the line 3—3 of Fig. 2.

In the drawings the numeral 4 refers to the mainland adjacent the river 5, and 6 to the bottom of the river. At various times the water level of the river changes from the low water level line 7 to the high water level line 8.

A tunnel 9 is constructed along or in the bottom of the river, extending from the mainland down to a position adjacent the low level line 7, the tunnel sloping generally with the bed of the river, that is, being inclined from the highest point to the low water level position. This tunnel may be of any suitable construction but is preferably of concrete and is provided with hatches or charging openings 10 at intervals along its top normally closed by hatch covers 11. An inclined track 12, mounted on supports 13 above or adjacent the tunnel and other supports 14 anchored in the river bed, extends from below the low water level line 7 to or beyond the high water level 8.

A boat-unloading device such as an unloading crane or tower 15 has a wheel-truck 16 mounted to travel on the track 12. This unloading device may be of any suitable construction and is shown as an unloading tower having an overhanging frame 17 upon which a traveler 18 moves out over the cargo boat 19 so that the bucket 20 for handling bulk material, generally a clam-shell bucket, may be lowered to receive its load, then raised and moved with the traveler to deposit its load into a hopper 21, from whence the material falls onto an endless conveyor 22 having a chute 23 at its outer end, the outer end of the conveyor being so placed as to cause the chute to deposit the material through one of the hatches 10 into the tunnel where it falls upon an endless belt conveyor 24 in the tunnel and is carried thereby to the upper end of the tunnel.

The conveyor 22 is preferably one that may be moved bodily with respect to the tower, as shown by the dotted and full line positions in the drawings.

The conveyor belt 24 runs over suitable pulleys 25 and 26 in the tunnel and is supported intermediate its ends by sets of idler pulleys or rollers 27 and 28. From the upper end of the tunnel the material delivered by the conveyor 23 may be taken care of in any suitabe manner, as, for instance, by means of an elevating conveyor 29, delivering it to a tipple 30 of usual construction, or chuting it across the tipple to an endless conveyor 31 leading to storage bins, not shown.

With the construction above described the boat-unloading device may be moved along the track to any position suitable for unloading material, more particularly bulk material, under water level conditions prevailing at that time and deposit the material into that hatch opening of the tunnel nearest the bridge in its then adjusted position so that the material may be carried up on the conveyor in the tunnel to the upper end and then taken to the desired place of deposit. As shown, the boat-unloading device is in a position for unloading at low water level.

I desire it to be understood that this invention is not to be limited to any specific form of arrangement of parts except in so far as such limitations are specified in the claims.

What I claim as my invention is:

1. An apparatus for unloading bulk material from boats on bodies of water subject to changes in water level, comprising an inclined tunnel extending from a position adjacent low water level to a position above higher water levels, said tunnel having openings at intervals along its length, a boat-unloading device movable with respect to the tunnel for discharging material taken from the boat into one of said openings above the water level prevailing at that time, means for closing such openings as may be under water, and means within the tunnel for moving material deposited therein to the upper end of the tunnel.

2. An apparatus for unloading bulk material from boats on bodies of water subject to changes in water level, comprising an inclined tunnel extending from a position adjacent low water level to a position above higher water levels, said tunnel having openings at intervals along its length, a boat-unloading device movable with respect to the tunnel for discharging material taken from the boat into one of said openings above the water level prevailing at that time, means for closing such openings to the tunnel as may be under water, and an endless conveyor within the tunnel for moving the material deposited therein to the upper end of the tunnel.

3. An apparatus for unloading bulk material from boats on bodies of water subject to changes in water level, comprising an inclined tunnel extending from a position adjacent low water level to a position above higher water levels, said tunnel having openings at intervals along its length, a track adjacent the tunnel, a boat-unloading device movable on said track for depositing material received from the boat into one of said openings above the water level prevailing at that time, means for closing such openings as may be under water, and means within the tunnel for moving the material deposited to the upper end of the tunnel.

4. An apparatus for unloading bulk material from boats on bodies of water subject to changes in water level, comprising an inclined tunnel extending from a position adjacent low water level to a position above higher water levels, said tunnel having openings at intervals along its length, a track adjacent the tunnel, a boat-unloading device movable on said track and including a bucket, hopper and conveyor for depositing material received from the boat into one of said openings above the water level prevailing at the time, means for closing such openings as may be under water, and an endless belt conveyor within the tunnel for moving the material deposited therein to the upper end of the tunnel.

In testimony whereof I affix my signature.

THOMAS S. WATSON.